United States Patent [19]
Yahnke et al.

[11] Patent Number: 5,342,709
[45] Date of Patent: * Aug. 30, 1994

[54] BATTERY UTILIZING CERAMIC MEMBRANES

[75] Inventors: Mark S. Yahnke, Berkeley, Calif.; Golan Shlomo, Haifa, Israel; Marc A. Anderson, Madison, Wis.

[73] Assignee: Wisconsin Alumni Research Foundation, Madison, Wis.

[*] Notice: The portion of the term of this patent subsequent to May 4, 2010 has been disclaimed.

[21] Appl. No.: 56,452

[22] Filed: May 3, 1993

Related U.S. Application Data

[63] Continuation-in-part of Ser. No. 717,789, Jun. 18, 1991, Pat. No. 5,208,121.

[51] Int. Cl.$^5$ .................................................. H01M 2/16
[52] U.S. Cl. ........................................ 429/162; 429/247
[58] Field of Search ............................... 429/162, 247

[56] References Cited

U.S. PATENT DOCUMENTS

| | | | |
|---|---|---|---|
| 3,178,314 | 4/1965 | Horn et al. | 429/162 X |
| 3,379,569 | 4/1968 | Berger et al. | |
| 3,379,570 | 4/1968 | Berger et al. | 429/247 X |
| 3,446,669 | 5/1969 | Arrance et al. | 429/247 |
| 3,539,394 | 10/1970 | Arrance | 429/247 X |
| 3,625,771 | 12/1971 | Arrance et al. | |
| 4,034,144 | 7/1977 | Chireau | 429/247 X |
| 5,006,248 | 4/1991 | Anderson et al. | 210/500.25 |
| 5,208,121 | 5/1993 | Yahnke et al. | 429/162 |

FOREIGN PATENT DOCUMENTS

| | | |
|---|---|---|
| 2233546 | 1/1973 | Fed. Rep. of Germany . |
| 1441686 | 5/1966 | France . |
| 1471511 | 1/1967 | France . |
| 801204 | 9/1958 | United Kingdom . |
| 2083277 | 3/1982 | United Kingdom . |

OTHER PUBLICATIONS 62-246270 Abstract from Japanese Sanyo Electric Co. Ltd. (Apr. 1988).

*Primary Examiner*—Stephen Kalafut
*Attorney, Agent, or Firm*—Quarles & Brady

[57] ABSTRACT

A thin film battery is disclosed based on the use of ceramic membrane technology. The battery includes a pair of conductive collectors on which the materials for the anode and the cathode may be spin coated. The separator is formed of a porous metal oxide ceramic membrane impregnated with electrolyte so that electrical separation is maintained while ion mobility is also maintained. The entire battery can be made less than 10 microns thick while generating a potential in the 1 volt range.

24 Claims, 1 Drawing Sheet

BATTERY UTILIZING CERAMIC MEMBRANES

STATEMENT REGARDING FEDERALLY SPONSORED RESEARCH

This invention was made with United States Government support awarded by the Department of Energy (DOE), Grant No. DE-AS07-86ID12626. The United States Government has certain rights in this invention.

CROSS-REFERENCE TO RELATED APPLICATION

This application is a continuation-in-part of U.S. Ser. No. 07/717,789, filed Jun. 18, 1991, now U.S. Pat. No. 5,208,121.

FIELD OF THE INVENTION

The present invention relates to electrochemical power sources in general and relates, in particular, to very thin alkaline dry cell batteries formulated using ceramic membranes.

BACKGROUND OF THE INVENTION

An alkaline dry cell battery is a storage device for electrical power intended to provide electrical power on demand to an electrically powered device. A dry cell battery is so called because its electrolyte is in the form of a moist paste, which is therefore not capable of being spilled, since it is in a semi-solid state. The typical commercially available dry cell batteries manufactured today are constructed as a cylinder. The cathode is typically a manganese dioxide ($MnO_2$) powder cathode, with additives, formed on the inside of the exterior cylindrical surface of the battery. The cathode layer is typically coated onto the interior of a cylindrical nickel plated steel can. The anode, formed of powdered zinc mixed with electrolyte, is located centrally in the cylinder of the battery. The centrally located cathode surrounded by an alkaline paste containing an electrolyte base, such as potassium hydroxide (KOH). Such alkaline dry cells are not rechargeable due to the irreversible disintegration of the cathode caused by its expansion as electrical power flows from the battery.

The present invention makes use of the technology of ceramic membranes. Ceramic membranes are compositions of matter which consist of a plurality of metal oxide particles which are partially fused together to form a material which is solid, rigid, stable, but which is also porous. The porosity of the ceramic membrane can be controlled by manipulation of process conditions during its fabrication so as to create pores in any desirable range of pore sizes. Such membranes can also be made over a wide range of densities. Typically, porous metal oxide ceramic membranes are made by sol-gel processes. In such processes first metal oxy-hydroxide particles are formed by a sort of inorganic polymerization/condensation from molecular precursors in a solution or suspension. The particles are maintained as partially soluble metal oxy-hydroxide particles in suspension by techniques such as peptization, aggressive agitation, steric stabilization using polymers, or other similar means to prevent aggregation and resultant precipitation of larger metal oxy-hydroxide particles. Such a metal oxy-hydroxide suspension, known as a sol, then has the solvent, either water or alcohol, removed from it to create a gelified, semi-solid material referred to as a gel. After further solvent removal and subsequent heating or firing of the gel, or xerogel, the particles which make up the gel are fused together to form a continuous metal oxide ceramic porous membrane material. One class of metal oxide porous ceramic membranes are disclosed in U.S. Pat. No. 5,006,248, which describes such materials with a uniquely small size range of pores therein.

SUMMARY OF THE INVENTION

The present invention is summarized in that a planar dry cell battery is constructed utilizing a porous metal oxide ceramic membrane separator material, so as to create a battery which is formed of extraordinarily thin film of material.

It is an object of the present invention to provide an alkaline dry cell battery utilizing a porous ceramic membrane material which is exceedingly thin yet, has significant power production, and which thus offers the potential for being stacked in compact assemblies to create high voltage batteries.

It is yet another object of the present invention to provide an extremely thin film battery which can be readily and efficiently manufactured.

Yet another object of the present invention is to enable the production of thin film batteries which could be manufactured in a variety of specialized geometries, to potentially produce self-powered devices.

Other objects, advantages, and features of the present invention will become apparent from the following specification when taken in conjunction with the accompanying drawing FIGURE.

BRIEF DESCRIPTION OF THE DRAWING FIGURE

DETAILED DESCRIPTION OF THE INVENTION

Figure 1:
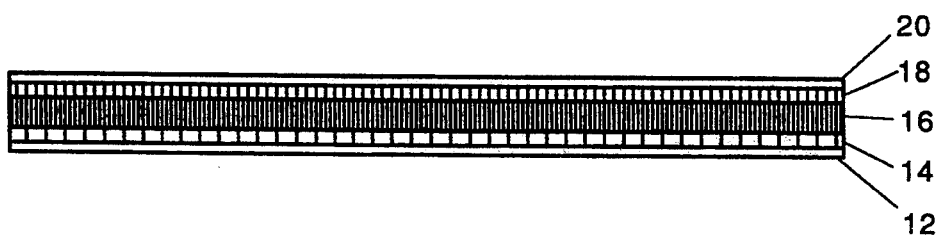
FIG. 1 is a cross-sectional view of the layers of an alkaline dry cell battery constructed in accordance with the present invention.

The battery of the present invention is constructed so as to be extraordinarily thin. As in most batteries, the battery of the present invention requires a cathode, an anode, and a separator for the battery. Because of the advantages achieved by the use of ceramic membrane technology for the construction of these layers, the individual layers, and the combination of the layers which make up the battery, can all be fabricated in thin films, while maintaining the electrical separation and the needed surface area to achieve significant electrical power. The present invention is illustratively described as an alkaline dry cell type battery, but it is intended that other classes of battery may also be constructed using this technology.

The battery described here incorporates into it one or more elements made from the class of materials referred to as porous metal oxide ceramic materials, also referred to in thin film forth as ceramic membranes or porous thin films. These materials are true ceramics, being formed of discrete particles of metal oxide material, formed in a colloidal solution, or sol, that are then fused together by heating or sintering into a unitary continuous material. By limiting the sintering temperatures, to less than 400° to 500° C. for most such metal oxides, but up to 800°–1000° C. for some, the porosity of the material can be retained even in the solid sintered state. Using modern controlled sol-gel chemistry, it is now possible to make such porous metal oxide ceramic materials with very small and tightly controlled sizes of particles. Since the particles are fused in essentially a close-packing formation, the sizes of the pores in the material are determined by the sizes of the particles forming the material. It is now possible to make such porous metal oxide ceramic materials having mean pore sizes, or diameters, of below about 100 Angstroms to even as small as 5 Angstroms. The porosity range of these materials (30–60%) also gives the materials high surface areas, in the range of 15 to 300 square meters per gram, which ensures good contact to liquids or other layers with which they are in contact.

Porous metal oxide ceramic membranes have been fabricated with a wide variety of metal and metalloid elements, including aluminum, tin, and silicon as well as many transition metals such as titanium, zirconium, vanadium, niobium, iron and zinc, and the alkali earth metals such as magnesium. The metals may be mixed in materials to change the characteristics of the materials, notably effecting tolerated sintering temperatures, electrical conductivity, and catalytic activity. Because the materials are malleable when in the gel state, they can be shaped in that state, prior to firing, or can be dipped or spun onto a substrate or support to a wide variety of final shapes or geometries.

The alkaline manganese dioxide zinc dry cell battery is based on zinc metal anode, a manganese dioxide cathode, and a separator which contains an absorbed electrolyte capable of charge transfer between the anode and the cathode. It is this general approach that is utilized in the exemplary battery described here.

The advantages of a thin cathode for such a battery have previously been described by Kordesch in "Primary Batteries—Alkaline Manganese Dioxide—Zinc Batteries" in Comprehensive Treatise on Electrochemistry. Kordesch reports that manganese dioxide electrodes 0.6 mm thick were shown to perform significantly better than the typically used cylindrical electrodes which were 3 mm thick. The reason for this is the more efficient transport of the reactants (e.g. $H_2O$ or $H+$) to the surface of the individual $MnO_2$ particles. Also, he showed that rechargeability becomes more efficient in thinner cathodes. In the battery described herein, the cathode can be made even thinner, by depositing a combination mixture of manganese dioxide and graphite particles, or other conductive metal particles, onto a support consisting of an inert conductive metal foil. The metal foil serves as a current collector for the cathode. The use of a mixture of manganese dioxide and graphite particles allows for improved conductivity within the cathode itself. Deposition of the manganese dioxide and graphite particles on the current collector can be achieved by spin-coating of the metal surface with a solgel derived manganese dioxide suspension containing a range of graphite between 7 and 20%, preferably around 15%. Using such a spin-coating technique from a sol gel derived suspension, it is possible to obtain a cathode layer which is on the order of 1 micron thick, coated onto a conductive metal foil backing. The cathode does not have to be porous, but does advantageously have a high surface area.

One problem which can occur in rechargeable batteries is the slow disintegration of the cathode during cell cycling. This occurs, in part, because the cathode expands during discharge. Hence the cathode must be well supported in order to have reliable battery design. The cathode design may thus make use of a ceramic material coated onto a metal substrate, thereby making the cathode very thin and also adjacent to the porous separator. Yet, because of the manner of deposition of the cathode material onto the support, a high surface contact area between the cathode and the electrolyte is maintained.

The battery separator in a battery prevents contact between the cathode and anode, and thus is essential to the performance of the cell in maintaining an electrochemical potential. The battery separator has two principal functions. First it must absorb within it the electrolyte, typically an electrolytic salt, such as the potassium hydroxide used here. Secondly the separator must prevent any penetration of the zinc from the anode toward the cathode to ensure that a short circuit of the battery does not occur. As stated earlier, an ideal material fitting these requirements is a porous metal oxide ceramic material, particularly one having small mean pore sizes. When such materials have very low pore sizes, such as less than 100 Angstroms for a mean pore diameter, capillary action tends to retain the electrolyte in the separator and any leakage of electrolyte is minimized. At the same time, the small pore sizes, and the non-linear geometry of the pores, hinders the dendritic growth of metal deposited on either of the electrodes, as sometimes occurs in other separators. These materials can also be quite thin while maintaining good separation and porosity.

In one battery constructed in accordance with the present invention, an aluminum oxide (gamma-$Al_2O_3$) porous ceramic membrane is used as the battery separator. This material achieves both objectives, acting as a good battery separator while also introducing into the battery the advantage of a very thin separator layer. Such an alumina metal oxide ceramic separator layer is porous and is a good insulator. In addition, the pore size range can be selected so as to be relatively impermeable to penetration of larger zinc particles. Such a membrane can be prepared by spin coating on a finished cathode assembly with a layer of a colloidal alumina (ganuna-AlOOH) suspension. By spin coating such a separator from a colloidal suspension, it is possible to make a porous ceramic aluminum oxide membrane of selectable porosity, and of any desired thickness between 0.1 and 10 microns, or thicker. Such membranes may be fired up to temperatures of 500° Centigrade, while retaining significant porosity. For some other separator materials, firing temperatures can be higher, as high as the range of 800° C. In general, the highest firing temperature possible will be used for each separator material which does not adversely affect the porosity of the separator material. By manipulating the production of the colloidal sol, the firing temperature, and other variables, the size of the pores in the membrane can also be controlled. The porous separators may then be impregnated with an electrolyte or salt solution.

Another advantageous choice for the separator is a zirconium dioxide porous matrix. Zirconium dioxide porous ceramics are robust and also resistant to the caustic basic conditions in an alkaline battery. Zirconium dioxide materials can be made with pores in the desired size range (less than 100 Angstroms) and can be deposited in quite thin layers of 0.1–2 microns. Another promising separator material would be magnesium oxide.

The anode of the thin film battery may be another thin layer, this time formed from a mixture mainly of colloidal zinc. The anode may be deposited via spin coating from a zinc sol on a cathode-separator assembly in a manner similar to preparation of the other layers. Alternatively, a ceramic $ZnO_2$ membrane can be reduced to create a zinc metal membrane with a large surface area. If the battery is desired to be rechargeable, the anode may also contain a structure such as copper or lead powder onto which the zinc can be plated during recharging.

The thin film battery of the present invention can be constructed by building up the appropriate layers from one conductor to the other in either order. As described below, the thin film battery is built up by successive deposition of layers from the cathode conductor to the anode conductor. The process can be begun at either of the two current collector or conductive surfaces.

A schematic of the layers of the thin film battery cell is shown in the drawing FIG. 1. Illustrated in FIG. 1, which is not sealed, is the order of the various layers of the thin film battery. The cathode collector layer, a metal foil current collecting surface, is designated at 12. The cathode itself, consisting of a manganese dioxide derived layer, mixed with graphite, is illustrated at 14, and is on the order of 1 micron in thickness. Designated at 16 is the aluminum oxide separator layer. The zinc anode is indicated at 18, and is approximately equal in thickness to the cathode. The anode current collector is indicated at 20, and is again a thin metal foil conductive sheet. In other embodiments, the anode current conductor 20 may be omitted and electrical contact made directly to the zinc metal anode. The overall size of the battery cell, in total, can be as little as 0.5 to 10 microns in total thickness.

The advantage of this thin film design for a battery over a conventional manganese dioxide/zinc battery is that there is a very large interface to volume ratio. This should, in theory, increase the potential power surge capability of the battery since, there is a greater surface contact between the electrodes and the electrolyte. This feature reduces mass transfer limitations that might otherwise be present in other geometries. It has previously been proposed that the limiting step in the reduction of manganese dioxide and an alkaline dry cell is the need for molecular diffusion of protons into the crystals of the cathode layer. This design which uses a very thin cathode layer, composed of very small particles, can theoretically increase the performance of a battery, by eliminating or decreasing this factor. In addition, the thin film battery is of a strikingly small thickness compared to prior art battery designs, and therefore may achieve a higher potential drop per unit length than previous designs would allow. For example, since battery cells of this design can generate an electrical potential of 1.4 volts with a total thickness of about 5 microns, if a series of similar batteries could be hooked together in series, and assuming that the aluminum oxide separator can effectively limit current leakage, a total voltage of 2800 volts could be theoretically generated by a multiple cell battery only 1 centimeter thick.

Figure 2:
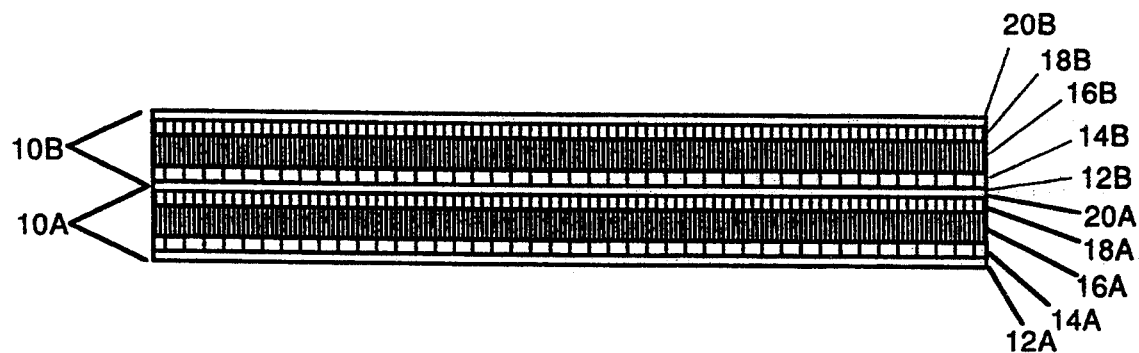
FIG. 2 is a cross-sectional view of the layers of an alternative embodiment of an alkaline dry cell battery constructed in accordance with the present invention.

The battery cell of FIG. 1 represents only a single cell. In many applications, it may be desirable to stack such cells. Shown in FIG. 2 is one way this might be done. Two cells 10A and 10B are shown with their parts labelled corresponding to FIG. 1 with a suffix "A" or "B" added. Thus there are two cathodes 14A and 14B, two separator layers 16A and 16B, and two anodes, 18A and 18B. The anode current collector 20A for cell 10A also serves as the cathode current collector 12B for cell 10B. The materials can be simply built up by multiple step processes of deposition. The potential between cathode 12A and anode 20B will be twice that of a single cell, while the overall thickness is still less than 20 microns. Clearly, additional cells can be stacked in the same fashion to add to whatever potential is desired.

Another possible variation on this battery is to also fabricate the cathode and/or anode surfaces out of metal oxide porous ceramic membranes. By suitable doping, it is possible to render such materials electrically conductive. See, for example, U.S. Pat. No. 5,028,568. The advantage of the use of such materials as cathode or anode surfaces is that the surface area of the electrode exposed to the electrolyte is increased dramatically, thereby increasing the theoretical energy storage density available in the battery.

EXAMPLE

Two batteries of the design of FIG. 1 were constructed beginning with a cathode collector plates of titanium. Two thin titanium plates approximately 20×20 ×0.5 mm were utilized as the substrate. An aqueous suspension containing 30 grams per liter of commercially available electrolytic manganese dioxide particles was obtained (Aldrich Chemical). The size of the particles in the commercially available suspension was not known. The suspension was then applied to the titanium plates using a spin coating apparatus (Headway Research PWM101D Spinner, R790 bowl) at 2000 rpm for 30 seconds or until visibly dry. Four successive coats of the manganese dioxide suspension were spun-coated onto the metal surfaces this way. Between each coating, the plates were fired at 400° C. for 30 minutes, to fire the layers of the cathode coating in place.

Next the battery separators were created for the two batteries. An aqueous gamma-alumina (AlOOH) sol was prepared. The alumina sol contained 60 grams per liter of alumina particles. The sol was spun onto the finished cathode assemblies at 750 rpm for 90 seconds. The coated cathode assemblies were fired at 500° C. for 1 hour. The resulting cathode and support assemblies were then soaked in 6 M KOH over night to impregnate the membrane with the potassium hydroxide electrolyte.

To verify that the cells were capable of generating electricity, a single unified zinc foil material was used as both the anode and the anode collector. Thin pieces of zinc foil, of approximately 10×10×0.1 mm, were cut and positioned directly onto the alumina membranes, in the manner illustrated in FIG. 1. Each entire assembly was then, in turn, sandwiched tightly between the two insulated ends of a C-clamp to ensure intimate contact between all components, particularly the zinc foil and the separator. The potential drop between the two electrodes was then measured with a digital multi-meter. Both batteries demonstrated high, although slightly varying open circuit voltages. One of the batteries measured 0.91 volts and the other measured 1.4 volts. The thickness of the batteries thus created was calculated to be between 1 and 5 microns.

Thus these test batteries, utilizing a planar zinc anode rather than a configuration with a higher surface area, demonstrated the feasibility of this approach to battery design. It is anticipated that by utilizing a spin coated zinc layer, having a higher surface area, that more efficient power generation will be achieved.

It is to be understood that the present invention is not limited to the particular embodiments described above, but embraces all such modified forms thereof as come within the scope of the following claims.

We claim:

1. A film battery comprising
    a cathode surface of conductive material;
    an anode surface of conductive material;
    a separator formed of a porous metal oxide ceramic material having a mean pore diameter of less than about 100 Angstroms, the separator impregnated with an electrolyte.

2. A film battery cell as claimed in claim 1 wherein the cathode surface includes a cathode surface of conductive material deposited on a conductive cathode collector.

3. A film battery cell as claimed in claim 1 wherein the anode surface includes an anode surface of conductive material deposited on a conductive anode collector.

4. A film battery cell as claimed in claim 1 wherein the separator is made of zirconium dioxide.

5. A film battery cell as claimed in claim 1 wherein the metal in the metal oxide ceramic material is selected from the group consisting of titanium, zirconium, zinc, iron, niobium, vanadium, aluminum, tin, silicon, and mixtures thereof.

6. A film battery cell as claimed in claim 1 wherein the separator layer is less than 10 microns in thickness.

7. A film battery cell as claimed in claim 1 wherein the cathode surface is a conductive metal oxide ceramic membrane deposited on a conductive support.

8. A battery cell as claimed in claim 1 wherein the anode surface is a conductive metal oxide ceramic membrane deposited on a conductive support.

9. A film battery cell comprising
    a cathode surface of conductive material;
    an anode surface of conductive material;
    a separator formed of a porous metal oxide ceramic material having a fused particulate structure and porosity such that the surface area of the separator layer is in excess of about 15 square meters per gram, the separator impregnated with an electrolyte.

10. A film battery cell as claimed in claim 9 wherein the cathode surface includes a cathode surface of conductive material deposited on a conductive cathode collector.

11. A film battery cell as claimed in claim 9 wherein the anode surface includes an anode surface of conductive material deposited on a conductive anode collector.

12. A film battery cell as claimed in claim 9 wherein the separator is made of zirconium dioxide.

13. A film battery cell as claimed in claim 9 wherein the metal in the metal oxide ceramic material is selected from the group consisting of titanium, zirconium, zinc, iron, niobium, vanadium, aluminum, tin, silicon, and mixtures thereof.

14. A film battery cell as claimed in claim 9 wherein the separator layer is less than 10 microns in thickness.

15. A film battery cell as claimed in claim 9 wherein the cathode surface is a conductive metal oxide ceramic membrane deposited on a conductive support.

16. A film battery cell as claimed in claim 9 wherein the anode surface is a conductive metal oxide ceramic membrane deposited on a conductive support.

17. A film multiple cell battery comprising:
    a first cathode of conductive material;
    a first anode of conductive material;
    a second cathode of conductive material placed adjacent to and electrically connected to the first anode;
    a second anode of conductive material;
    both the first cathode and anode and the second cathode and anode being separated by respective separator layers of thin film porous metal oxide ceramic membranes, the separator layers being less than 10 microns in thickness, the separator layers being impregnated with electrolytes so that the two cells formed by the respective cathode and anode pairs with corresponding separator layers form a thin film battery.

18. A film battery cell as claimed in claim 17 wherein the first and second cathodes each includes a cathode surface of conducive material deposited on a conductive cathode collector.

19. A film battery cell as claimed in claim 17 wherein the first and second anodes each includes an anode surface of conductive material deposited on a conductive anode collector.

20. A film battery cell as claimed in claim 17 wherein the separator layers are made of zirconium dioxide.

21. A film battery cell as claimed in claim 17 wherein the metal in the metal oxide ceramic material is selected from the group consisting of titanium, zirconium, zinc, iron, niobium, vanadium, aluminum, tin, silicon, and mixtures thereof.

22. A film battery cell as claimed in claim 17 wherein each separator layer is less than 10 microns in thickness.

23. A film battery cell as claimed in claim 17 wherein the cathode is a conductive metal oxide ceramic membrane deposited on a conductive support.

24. A film battery cell as claimed in claim 17 wherein the anode is a conductive metal oxide ceramic membrane deposited on a conductive support.

* * * * *